US007014589B2

(12) United States Patent
Stevenson

(10) Patent No.: US 7,014,589 B2
(45) Date of Patent: Mar. 21, 2006

(54) SEVEN-SPEED TRANSMISSION

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 136 days.

(21) Appl. No.: 10/784,344

(22) Filed: Feb. 23, 2004

(65) Prior Publication Data

US 2004/0266580 A1 Dec. 30, 2004

Related U.S. Application Data

(60) Provisional application No. 60/482,184, filed on Jun. 24, 2003.

(51) Int. Cl.
*F16H 3/44* (2006.01)

(52) U.S. Cl. ....................................... 475/284; 475/288

(58) Field of Classification Search ................ 475/284, 475/323, 325, 288

See application file for complete search history.

(56) References Cited

U.S. PATENT DOCUMENTS

| | | | | |
|---|---|---|---|---|
| 3,444,762 A * | 5/1969 | Golan et al. | 475/133 |
| 4,070,927 A | 1/1978 | Polak | 74/765 |
| 4,395,925 A * | 8/1983 | Gaus | 475/284 |
| 4,709,594 A | 12/1987 | Maeda | 74/753 |
| 4,869,139 A * | 9/1989 | Gotman | 475/269 |
| 4,884,471 A * | 12/1989 | Daggett et al. | 475/285 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,558,287 B1 | 5/2003 | Hayabuchi et al. | 475/271 |
| 2005/0101431 A1 * | 5/2005 | Allen et al. | 475/286 |

* cited by examiner

*Primary Examiner*—Roger Pang
(74) *Attorney, Agent, or Firm*—Christopher DeVries

(57) ABSTRACT

A seven-speed transmission includes an input shaft, an output shaft, and a planetary gear arrangement having first, second, third and fourth planetary gear sets, each planetary gear set having first, second and third members. First and second interconnecting members continuously interconnect members of the planetary gear sets. Seven torque-transmitting mechanisms are engaged in combinations of three to establish seven forward speed ratios and a reverse speed ratio between the input shaft and the output shaft. The transmission is alternatively operable through two different sets of six speeds by engaging the sixth or seventh torque-transmitting mechanism before cycling the transmission through different speed ratios. In this manner, the transmission is operable as a dual six-speed transmission.

13 Claims, 4 Drawing Sheets

| GEAR STATE | GEAR RATIO | RATIO STEPS | CLUTCHING ELEMENTS (NAME/TYPE/GEAR NODE CONNECTION) | | | | | | | | | | | |
|---|---|---|---|---|---|---|---|---|---|---|---|---|---|---|
| | | | C1234 (80) CLUTCH | CB26 (82) CLUTCH | C35R (84) CLUTCH | C456 (86) CLUTCH | CB1R (87) CLUTCH | CL0 (88) CLUTCH | Chi (89) CLUTCH | | | | | |
| | | | PC3 | S2 | PC3 | R3 | PC2 | S4 | S4 | | | | | |
| | | | S1 | GROUND | S2 | PC1 | GROUND | GROUND | R1 | | | | | |
| Rev | -4.085 | | | | G | | X | X | | | | | | |
| N | | -0.76 | | | | | O | X | | | | | | |
| 1st | 5.372 | | X | | | | O | X | | | | | | |
| 2nd | 3.152 | 1.70 | X | X | | | | X | | | | | | |
| 3rd | 2.043 | 1.54 | X | | X | | | X | | | | | | |
| 4th | 1.532 | 1.33 | X | | X | | | | X | | | | | |
| 5th | 1.152 | 1.33 | X | | | X | | | X | | | | | |
| 6th | 0.852 | 1.35 | | | X | X | | | X | | | | | |
| 7th | 0.667 | 1.28 | | X | | X | | | X | | | | | |
| 8th | | | | | | | | | | | | | | |

FIG. 3

SEVEN-SPEED TRANSMISSION

CROSS-REFERENCE TO RELATED APPLICATION

This application claims the benefit of U.S. Provisional Application 60/482,184, filed Jun. 24, 2003, which is hereby incorporated by reference in its entirety.

TECHNICAL FIELD

The present invention relates to a transmission having four planetary gear sets that are controlled by seven torque-transmitting mechanisms to provide seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft) transmissions were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

A seven-speed transmission is provided using minimal content, and in a manner which achieves desirable ratio steps and a wide overall ratio. The invention is also operable as a dual six-speed transmission which may be cycled through two different sets of six speeds by engaging a high or low torque-transmitting mechanism before launching the vehicle.

Specifically, the multi-speed transmission includes an input shaft, an output shaft, and a planetary gear arrangement having first, second, third and fourth planetary gear sets, each planetary gear set having first, second and third members. The input shaft is continuously interconnected with the first member of the first planetary gear set, and the output shaft is continuously interconnected with the second member of the fourth planetary gear set. The first member of the second planetary gear set is integral with the first member of the third planetary gear set; and the third member of the first planetary gear set is continuously connected with a transmission housing.

A first interconnecting member continuously interconnects the second member of the second planetary gear set with the second member of the third planetary gear set, and a second interconnecting member continuously interconnects the first member of the third planetary gear set with the first member of the fourth planetary gear set.

Seven torque-transmitting mechanisms are provided. A first torque-transmitting mechanism selectively interconnects the second member of the first planetary gear set with the third member of the third planetary gear set. A second torque-transmitting mechanism selectively interconnects the third member of the second planetary gear set with the transmission housing. A third torque-transmitting mechanism selectively interconnects the second member of the first planetary gear set with the third member of the second planetary gear set. A fourth torque-transmitting mechanism selectively interconnects the first member of the first planetary gear set with the second member of the third planetary gear set. A fifth torque-transmitting mechanism selectively interconnects the second member of the second planetary gear set with the transmission housing. A sixth torque-transmitting mechanism selectively interconnects the third member of the fourth planetary gear set with the transmission housing. A seventh torque-transmitting mechanism selectively interconnects the first member of the fourth planetary gear set with the third member of the fourth planetary gear set. The seven torque-transmitting mechanisms are engaged in combinations of three to establish seven forward speed ratios and a reverse speed ratio between the input shaft and the output shaft.

The transmission is alternatively operable through two different sets of six speeds by engaging the sixth or seventh torque-transmitting mechanism before cycling the transmission through the different speed ratios. In this manner, the transmission is operable as a dual six-speed transmission.

Another aspect of the invention provides an add-on assembly for attachment to a six-speed transmission. The add-on assembly includes a planetary gear set having a sun gear, a ring gear and a planet carrier assembly member. A low ratio clutch selectively connects the sun gear to ground. A high ratio clutch selectively connects the ring gear to the sun gear. An interconnecting member connects the ring gear to a gear member of the six-speed transmission. The planet carrier assembly member is connected to an output member. The low ratio clutch and high ratio clutch are alternatively engageable to convert the six-speed transmission to a seven-speed transmission. Accordingly, the add-on assembly may be attached to a mass-produced six-speed transmission to produce low volumes of seven-speed transmissions at minimal cost.

The above features and other features and advantages of the present invention are readily apparent from the following detailed description of the best mode for carrying out the invention when taken in connection with the accompanying drawings.

BRIEF DESCRIPTION OF THE DRAWINGS

FIG. 3 shows a truth table corresponding with the embodiment of FIGS. 1 and 2.

DESCRIPTION OF THE PREFERRED EMBODIMENTS

Figure 1:
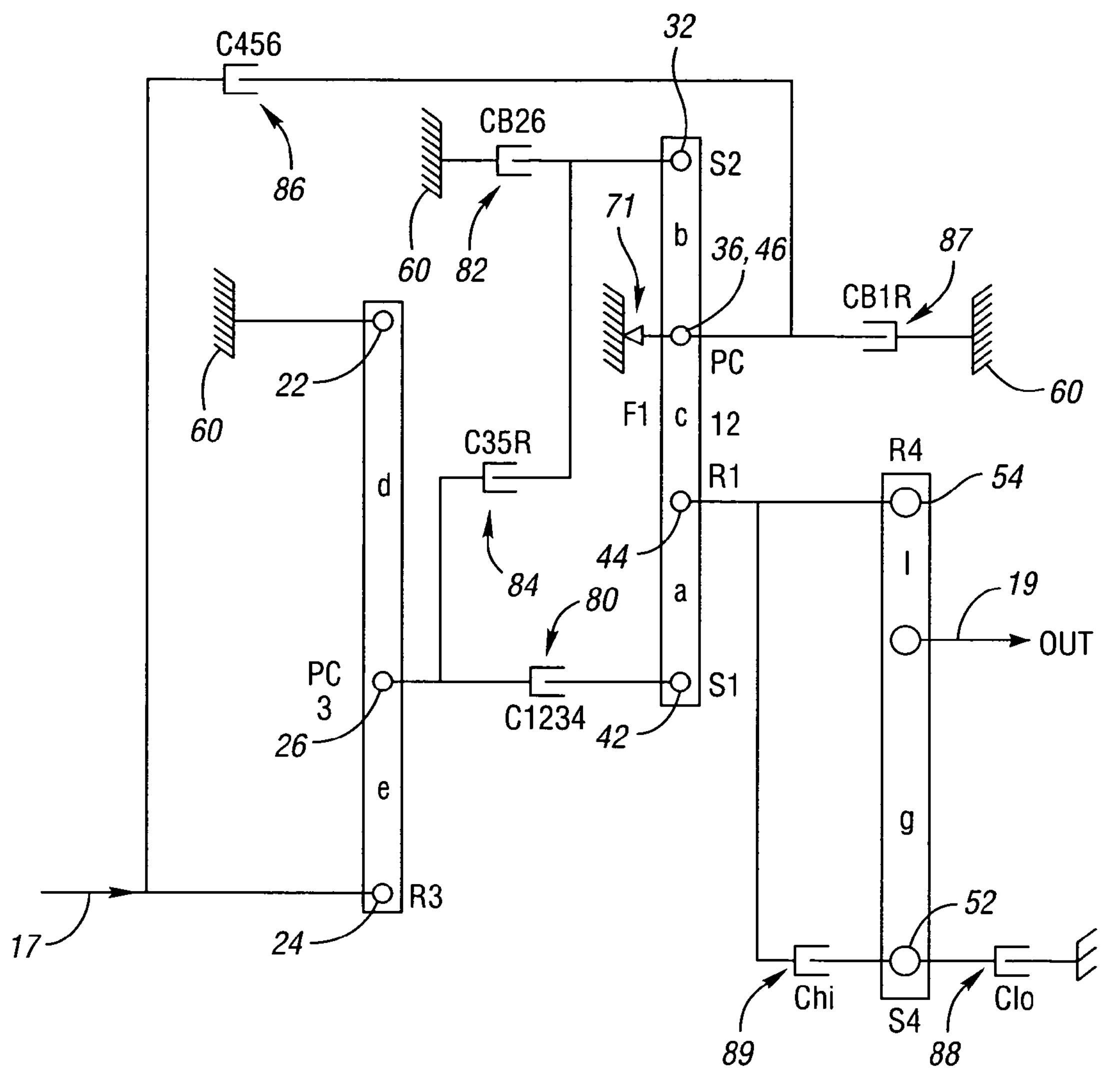
FIG. 1 shows a lever diagram of a transmission in accordance with the invention.
Figure 2:
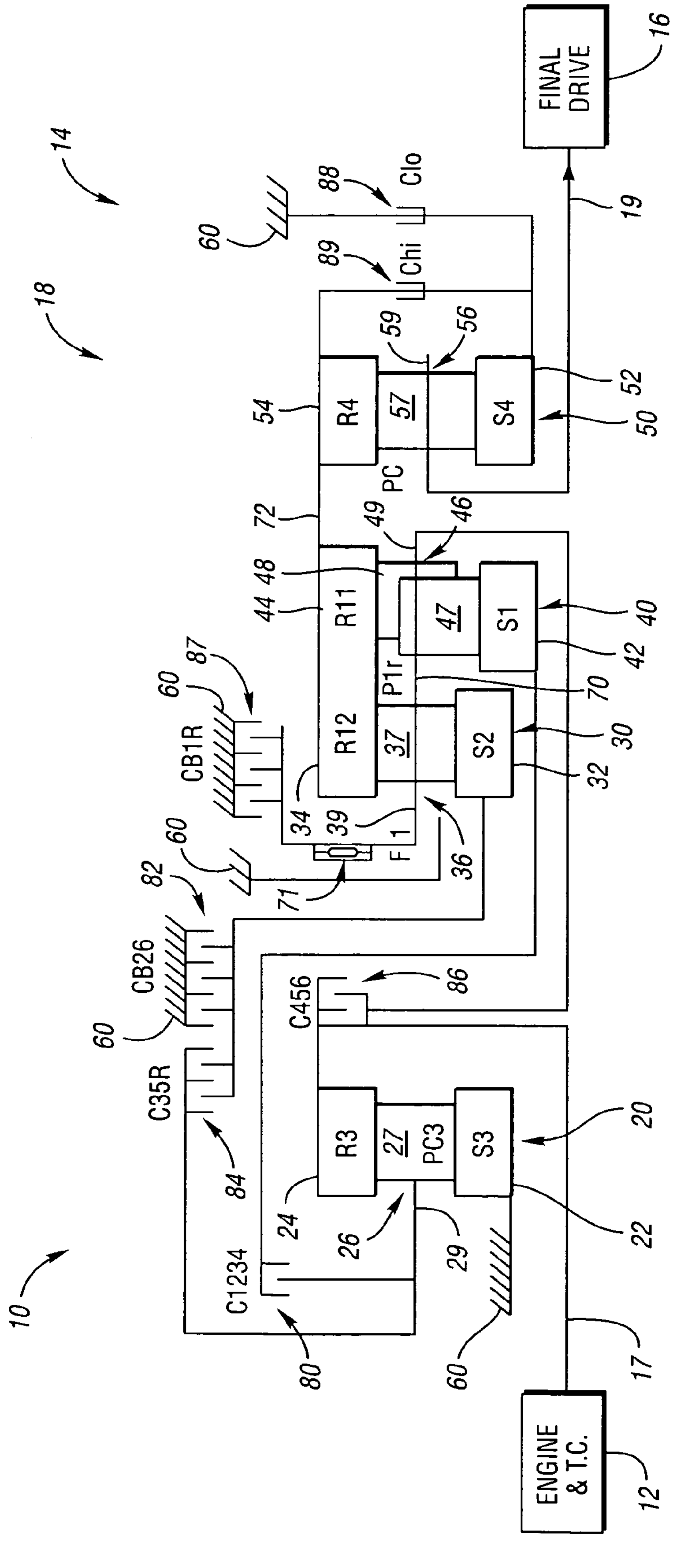
FIG. 2 shows a stick diagram corresponding with the lever diagram of FIG. 1.

Referring to FIG. 2, a stick diagram is shown for a transmission in accordance with the invention corresponding with the lever diagram of FIG. 1 and the various tables of FIG. 3. Like reference numbers are used to refer to like components in FIGS. 1–3. As shown in FIG. 2, a powertrain 10 includes a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes four planetary gear sets 20, 30, 40 and 50, viewed from left to right in FIG. 2.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34. The planetary gear set 30 is a simple planetary gear set.

The planetary gear set 40 includes a sun gear member 42, a ring gear member 44, and a planet carrier assembly member 46. The planet carrier assembly member 46 includes a plurality of pinion gears 47, 48 rotatably mounted on a carrier member 49 to form a compound planetary gear set. The pinion gears 47 are disposed in meshing relationship with the sun gear member 42, and the pinion gears 48 are disposed in meshing relationship with the ring gear member 44. The pinion gears 47, 48 mesh with each other also. The ring gear member 44 is formed integrally with the ring gear member 34 such that a single elongated ring gear member forms both components. Alternatively, the ring gear members 34, 44 may be connected together by being splined to a common sleeve and separated by a spacer and spring. The planetary gear set 40 is a compound planetary gear set.

The planetary gear set 50 includes a sun gear member 52, a ring gear member 54, and a planet carrier assembly member 56. The planet carrier assembly member 56 includes a plurality of pinion gears 57 rotatably mounted on a carrier member 59 and disposed in meshing relationship with both the sun gear member 52 and the ring gear member 54.

The planetary gear arrangement 18 also includes seven torque-transmitting mechanisms 80, 82, 84, 86, 87, 88, 89. The torque-transmitting mechanisms 82, 87, 88 are stationary-type torque-transmitting mechanisms, commonly termed brakes or reaction clutches. The torque-transmitting mechanisms 80, 84, 86, 89 are rotating-type torque-transmitting mechanisms, commonly termed clutches.

The input shaft 17 is continuously connected with the ring gear member 24, and the output shaft 19 is continuously connected with the planet carrier assembly member 56. A first interconnecting member 70 continuously connects the planet carrier assembly member 36 with the planet carrier assembly member 46. A second interconnecting member 72 continuously connects the ring gear member 44 with the ring gear member 54. Also, the sun gear member 22 is continuously connected with the transmission housing 60, and a free wheeler 71 is optionally connected between the carrier 36 and the transmission housing 60.

As referred to in the claims, the planetary gear set 20 is the first planetary gear set, the planetary gear set 30 is the second planetary gear set, the planetary gear set 40 is the third planetary gear set, and the planetary gear set 50 is the fourth planetary gear set. Also referenced in the claims are first, second and third members of each planetary gear set. In the preferred embodiment, each first member is a ring gear member, each second member is a carrier, and each third member is a sun gear member. Also, the torque-transmitting mechanism 80 is referred to as the first torque-transmitting mechanism, the torque-transmitting mechanism 82 is the second torque-transmitting mechanism, the torque-transmitting mechanism 84 is the third torque-transmitting mechanism, the torque-transmitting mechanism 86 is the fourth torque-transmitting mechanism, the torque-transmitting mechanism 87 is the fifth torque-transmitting mechanism, the torque-transmitting mechanism 88 is the sixth torque-transmitting mechanism, and the torque-transmitting mechanism 89 is the seventh torque-transmitting mechanism.

The planet carrier assembly member 26 is selectively connectable with the sun gear member 42 through the clutch 80. The sun gear member 32 is selectively connectable with the transmission housing 60 through the brake 82. The planet carrier assembly member 26 is selectively connectable with the sun gear member 32 through the clutch 84. The ring gear member 24 is selectively connectable with the planet carrier assembly member 46 through the clutch 86. The planet carrier assembly member 36 is selectively connectable with the transmission housing 60 through the brake 87. The sun gear member 52 is selectively connectable with the transmission housing 60 through the brake 88. The ring gear member 54 is selectively connectable with the sun gear member 52 through the clutch 89.

As shown in the truth table of FIG. 3, the torque-transmitting mechanisms 80, 82, 84, 86, 87, 88, 89 are selectively engaged in combinations of three to provide seven forward speed ratios and one reverse speed ratio. It should also be noted in the truth table that the torque-transmitting mechanisms 87, 88 remain engaged through the neutral condition, thereby simplifying the forward/reverse interchange.

To establish the reverse speed ratio, the torque-transmitting mechanisms 84, 87, and 88 are engaged. The overall numerical value of the reverse speed ratio is −4.085 as indicated in the truth table.

The first forward speed ratio is established with the engagement of the torque-transmitting mechanisms 80, 87, 88. The overall numerical value of the first forward speed ratio is 5.372, as indicated in the truth table.

The second forward speed ratio is established with the engagement of the torque-transmitting mechanisms 80, 82, 88. The overall numerical value of the second forward speed ratio is 3.152, as indicated in the truth table of FIG. 3.

The third forward speed ratio is established with the engagement of the torque-transmitting mechanisms 80, 84, 88. The numerical value of the third forward speed ratio is 2.043, as indicated in the truth table.

The fourth forward speed ratio is established with the engagement of the torque-transmitting mechanisms 80, 84, 89. The numerical value of the fourth forward speed ratio is 1.532, as indicated in the truth table.

The fifth forward speed ratio is established with the engagement of the clutches 80, 86, 89. The numerical value of the fifth forward speed ratio is 1.152, as indicated in the truth table.

The sixth forward speed ratio is established with the engagement of the clutches 84, 86, 89. The numerical value of the sixth forward speed ratio is 0.0852, as indicated in the truth table.

The seventh forward speed ratio is established with the engagement of the clutches 82, 86, 89. The numerical value of the seventh forward speed ratio is 0.667, as indicated in the truth table of FIG. 3.

As set forth above, the engagement schedules for the torque-transmitting mechanisms are shown in the truth table of FIG. 3. This table also provides an example of speed ratios that are available using the ring gear/sun gear tooth ratios given by way of example in the R/S Ratios Table of FIG. 3. The ring gear/sun gear tooth ratio of the planetary gear set 20 is preferably 1.88; the ring gear/sun gear tooth ratio of the planetary gear set 30 is preferably 2.00; the ring gear/sun gear tooth ratio of the planetary gear set 40 is preferably 2.63; and the ring gear/sun gear tooth ratio of the planetary gear set 50 is preferably 3.00. The truth table of FIG. 3 also describes the ratio steps that are attained utilizing the sample tooth ratios given. For example, the step ratio between the first and second forward ratios is 1.70, while the step ratio between the reverse and first forward ratio is −0.76. It can also be readily determined from the truth table of FIG. 3 that all of the single step forward ratio interchanges are of the single transition variety.

As an alternative, the above-described transmission may be used as a dual six-speed transmission in which either clutch 88 or 89 would be selected at zero miles per hour, depending upon load history or manual input to the controls. Applying clutch 88 would increase all six ratios by the ratio of the new gear set, which may be about 1.33. For example, the ratios resulting from application of clutch 88 would be: Rev (4.08); $1^{st}$=5.37; $2^{nd}$=3.15; $3^{rd}$=2.04; $4^{th}$=1.53; $5^{th}$=1.13; and $6^{th}$=0.89. This would be effective for hauling loads. Applying clutch 89 would result in the following ratios: Rev=(3.064); $1^{st}$=4.027; $2^{nd}$=2.364; $3^{rd}$=1.532; $4^{th}$=1.152; $5^{th}$=0.85; and $6^{th}$=0.667.

Therefore, the transmission is operable through two different sets of six speeds by engaging the sixth or the seventh torque-transmitting mechanism before cycling the transmission through different speed ratios.

The seventh torque-transmitting mechanism 89 shown in FIG. 2 may alternatively connect the ring gear 54 to the planet carrier assembly member 56, or connect the sun gear 52 to the planet carrier assembly member 56, and achieve the same ratios described above.

Figure 4:
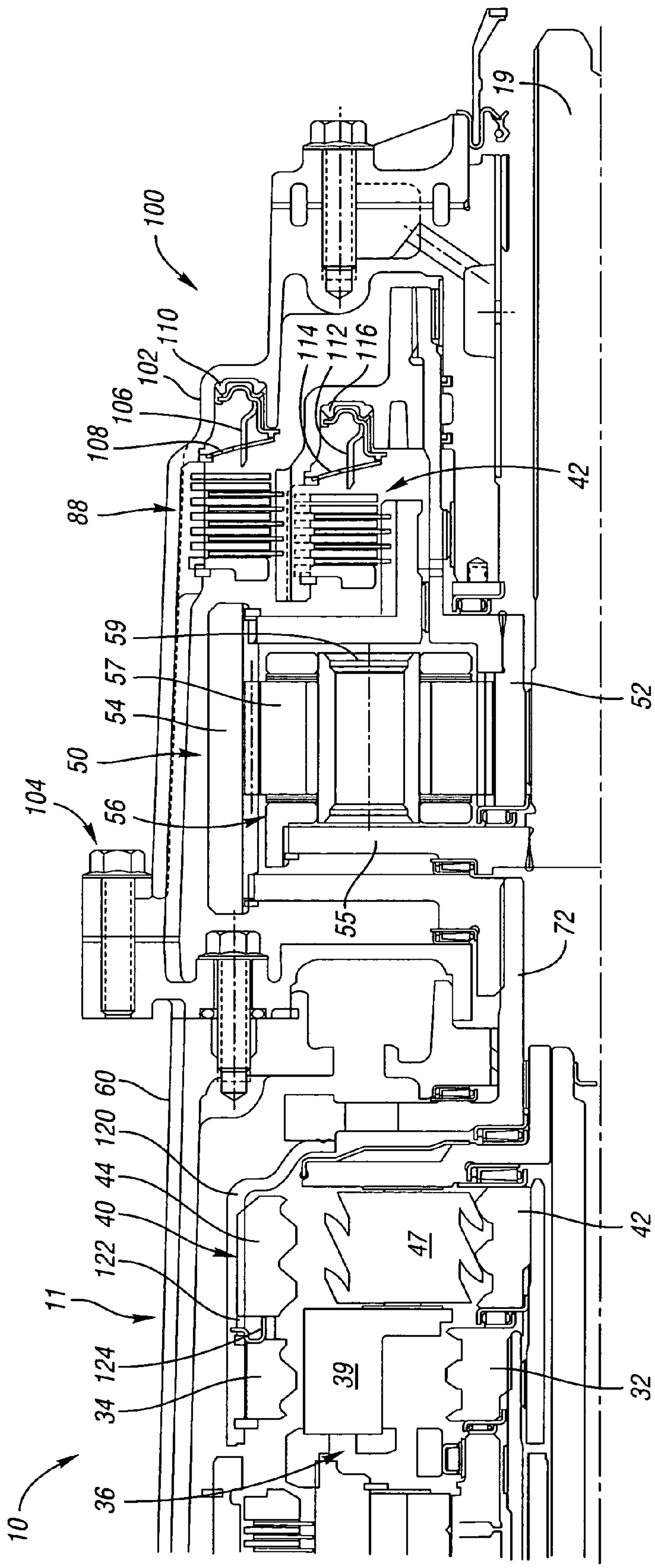
FIG. 4 shows a partial longitudinal cross-sectional view of a transmission corresponding with FIGS. 1–3.

FIG. 4 shows a partial longitudinal cross-sectional view of a portion of a transmission corresponding with FIGS. 1–3. Specifically, FIG. 4 illustrates the add-on portion which is attached to a six-speed transmission to convert it to a seven speed.

Reference numeral 11 of FIG. 4 identifies a six-speed transmission to which the add-on assembly 100 is attached to convert it to a seven-speed transmission. The add-on assembly 100 includes a case 102 which is attached to the transmission housing 60 by the bolts 104, for example. The add-on assembly 100 includes the planetary gear set 50, with the ring gear 54, pinions 57, planet carrier assembly member 56, and sun gear 52 arranged as shown. The planet carrier assembly member 56 is connected with the output shaft 19 via the plate 55.

The low clutch 88 is applied by the piston member 106 against the force of the return spring 108 when pressurized fluid is forced into the apply chamber 110. The low clutch 88 selectively connects the sun gear 52 with the case 102 to provide a low speed/high torque range of operation. Similarly, the high clutch 89 is applied by the piston member 112 against the force of the return spring 114 when pressurized fluid is forced into the apply chamber 116. The high clutch 89 selectively connects the ring gear 54 with the sun gear 52 to provide a high speed/low torque range of operation.

The interconnecting member 72 continuously connects the ring gear 54 with the ring gear 44 via the sleeve 120. The ring gears 34 and 44 are integrally connected by both being splined to the sleeve 120, and are separated by a spacer 122 and spring 124. FIG. 4 also shows the sun gears 32, 42, the pinion 47, carrier 39, and planet carrier assembly member 36.

Accordingly, the add-on assembly 100 may be simply attached to a six-speed transmission to convert it to a seven speed, or to convert it to a dual six speed.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:

an input shaft;

an output shaft;

a planetary gear arrangement having first, second, third and fourth planetary gear sets, each planetary gear set having first, second and third members;

said input shaft being continuously interconnected with said first member of said first planetary gear set, and said output shaft being continuously interconnected with said second member of said fourth planetary gear set;

and said third member of said first planetary gear set being continuously connected with a transmission housing;

a first interconnecting member continuously interconnecting said second member of said second planetary gear set with said second member of said third planetary gear set, and a second interconnecting member continuously interconnecting said first member of said third planetary gear set with said first member of said fourth planetary gear set;

a first torque-transmitting mechanism selectively interconnecting said second member of said first planetary gear set with said third member of said third planetary gear set;

a second torque-transmitting mechanism selectively interconnecting said third member of said second planetary gear set with said transmission housing;

a third torque-transmitting mechanism selectively interconnecting said second member of said first planetary gear set with said third member of said second planetary gear set;

a fourth torque-transmitting mechanism selectively interconnecting said first member of said first planetary gear set with said second member of said third planetary gear set;

a fifth torque-transmitting mechanism selectively interconnecting said second member of said second planetary gear set with said transmission housing;

a sixth torque-transmitting mechanism selectively interconnecting said third member of said fourth planetary gear set with said transmission housing;

a seventh torque-transmitting mechanism selectively interconnecting said first member of said fourth planetary gear set with said third member of said fourth planetary gear set; and said first, second, third, fourth, fifth, sixth and seventh torque-transmitting mechanisms being engaged in combinations of three to establish seven forward speed ratios and a reverse speed ratio between said input shaft and said output shaft.

2. The transmission of claim 1, wherein said first member of said second planetary gear set and said first member of said third planetary gear set comprise a single elongated ring gear.

3. The transmission of claim 1, wherein said second planetary gear set is a simple planetary gear set, and said third planetary gear set is a compound planetary gear set.

4. The transmission of claim 1, wherein each of said first members is a ring gear, each of said second members is a planet carrier assembly member, and each of said third members is a sun gear.

5. The transmission of claim 1, wherein the transmission is operable through two different sets of six speeds by engaging said sixth or said seventh torque-transmitting mechanism before cycling the transmission through different speed ratios.

6. A multi-speed transmission comprising:

an input shaft;

an output shaft;

a planetary gear arrangement having first, second, third and fourth planetary gear sets, each planetary gear set having a ring gear, a sun gear and a planet carrier assembly member;

said input shaft being continuously interconnected with said ring gear of said first planetary gear set, and said output shaft being continuously interconnected with said planet carrier assembly member of said fourth planetary gear set;

said sun gear of said first planetary gear set being continuously connected with a transmission housing;

a first interconnecting member continuously interconnecting said planet carrier assembly member of said second planetary gear set with said planet carrier assembly member of said third planetary gear set, and a second interconnecting member continuously interconnecting said ring gear of said third planetary gear set with said ring gear of said fourth planetary gear set;

a first torque-transmitting mechanism selectively interconnecting said planet carrier assembly member of said first planetary gear set with said sun gear of said third planetary gear set;

a second torque-transmitting mechanism selectively interconnecting said sun gear of said second planetary gear set with said transmission housing;

a third torque-transmitting mechanism selectively interconnecting said planet carrier assembly member of said first planetary gear set with said sun gear of said second planetary gear set;

a fourth torque-transmitting mechanism selectively interconnecting said ring gear of said first planetary gear set with said planet carrier assembly member of said third planetary gear set;

a fifth torque-transmitting mechanism selectively interconnecting said planet carrier assembly member of said second planetary gear set with said transmission housing;

a sixth torque-transmitting mechanism selectively interconnecting said sun gear of said fourth planetary gear set with said transmission housing;

a seventh torque-transmitting mechanism selectively interconnecting said ring gear of said fourth planetary gear set with said sun gear of said fourth planetary gear set; and said first, second, third, fourth, fifth, sixth and seventh torque-transmitting mechanisms being engaged in combinations of three to establish seven forward speed ratios and a reverse speed ratio between said input shaft and said output shaft.

7. The transmission of claim 6, wherein said ring gear of said second planetary gear set and said ring gear of said third planetary gear set comprise a single elongated ring gear.

8. The transmission of claim 6, wherein said second planetary gear set is a simple planetary gear set, and said third planetary gear set is a compound planetary gear set.

9. The transmission of claim 6, wherein the transmission is operable through two different sets of six speeds by engaging said sixth or said seventh torque-transmitting mechanism before cycling the transmission through different speed ratios.

10. A dual six-speed transmission comprising:

an input shaft;

an output shaft;

a planetary gear arrangement having first, second, third and fourth planetary gear sets, each planetary gear set having first, second and third members;

said input shaft being continuously interconnected with said first member of said first planetary gear set, and said output shaft being continuously interconnected with said second member of said fourth planetary gear set;

said third member of said first planetary gear set being continuously connected with a transmission housing;

a first interconnecting member continuously interconnecting said second member of said second planetary gear set with said second member of said third planetary gear set, and a second interconnecting member continuously interconnecting said first member of said third planetary gear set with said first member of said fourth planetary gear set;

a first torque-transmitting mechanism selectively interconnecting said second member of said first planetary gear set with said third member of said third planetary gear set;

a second torque-transmitting mechanism selectively interconnecting said third member of said second planetary gear set with said transmission housing;

a third torque-transmitting mechanism selectively interconnecting said second member of said first planetary gear set with said third member of said second planetary gear set;

a fourth torque-transmitting mechanism selectively interconnecting said first member of said first planetary gear set with said second member of said third planetary gear set;

a fifth torque-transmitting mechanism selectively interconnecting said second member of said second planetary gear set with said transmission housing;

a sixth torque-transmitting mechanism selectively interconnecting said third member of said fourth planetary gear set with said transmission housing;

a seventh torque-transmitting mechanism selectively interconnecting said first member of said fourth planetary gear set with said third member of said fourth planetary gear set; and wherein either said sixth or said seventh torque-transmitting mechanism is preselected for engagement in a low or high mode, and two of said first, second, third, fourth and fifth torque-transmitting mechanisms are also selectively engaged to establish six low or high forward speed ratios and a reverse speed ratio between said input shaft and said output shaft.

11. The transmission of claim 10, wherein said first member of said second planetary gear set and said first member of said third planetary gear set comprise a single elongated ring gear.

12. The transmission of claim 10, wherein said second planetary gear set is a simple planetary gear set, and said third planetary gear set is a compound planetary gear set.

13. The transmission of claim 10, wherein each of said first members is a ring gear, each of said second members is a planet carrier assembly member, and each of said third members is a sun gear.

* * * * *